United States Patent [19]

Bongartz

[11] Patent Number: 4,722,559
[45] Date of Patent: Feb. 2, 1988

[54] SPRAY HOSE ASSEMBLY

[76] Inventor: Heinz Bongartz, BocholterWeg 1, D-4054 Nettetal 1, Fed. Rep. of Germany

[21] Appl. No.: 881,072

[22] Filed: Jul. 2, 1986

[51] Int. Cl.$^4$ .............................................. F16L 47/00
[52] U.S. Cl. ................................. 285/132; 285/137.1; 239/600
[58] Field of Search ...................... 285/132, 137.1, 423; 239/600, 390, 391, 396

[56] References Cited

U.S. PATENT DOCUMENTS

| | | | |
|---|---|---|---|
| 2,877,028 | 3/1959 | Knight | 285/137.1 |
| 4,107,452 | 8/1978 | Razvi | 285/423 |
| 4,345,786 | 8/1982 | Egert | 285/137.1 |
| 4,599,171 | 7/1986 | Padilla et al. | 285/137.1 |

Primary Examiner—Peter A. Aschenbrenner
Assistant Examiner—Gerald A. Anderson
Attorney, Agent, or Firm—Sommer & Sommer

[57] ABSTRACT

A spray hose comprises a plurality of ducts extending through the length thereof, and a plurality of spray slots which are distributed over the lengths of the respective ducts and which open under pressure to provide a spray from the hose. Mounted at the ends of the hose are suitable fitments. Each fitment has a plurality, corresponding to the number of ducts in the hose, of insertion nipples providing internal ducts therein. The outside diameters of the insertion nipples correspond at least to the inside diameters of the ducts in the hose and the insertion nipples are jointly carried on a plate member which also has openings therethrough, communicating with the ducts in the insertion nipples. The region of the hose into which the insertion nipples are fitted is embraced by a clamping means to clamp the hose around the insertion nipples, with a substantially liquid-tight seal between the insertion nipples and the respective ducts in the hose, into which the nipples are fitted.

7 Claims, 2 Drawing Figures

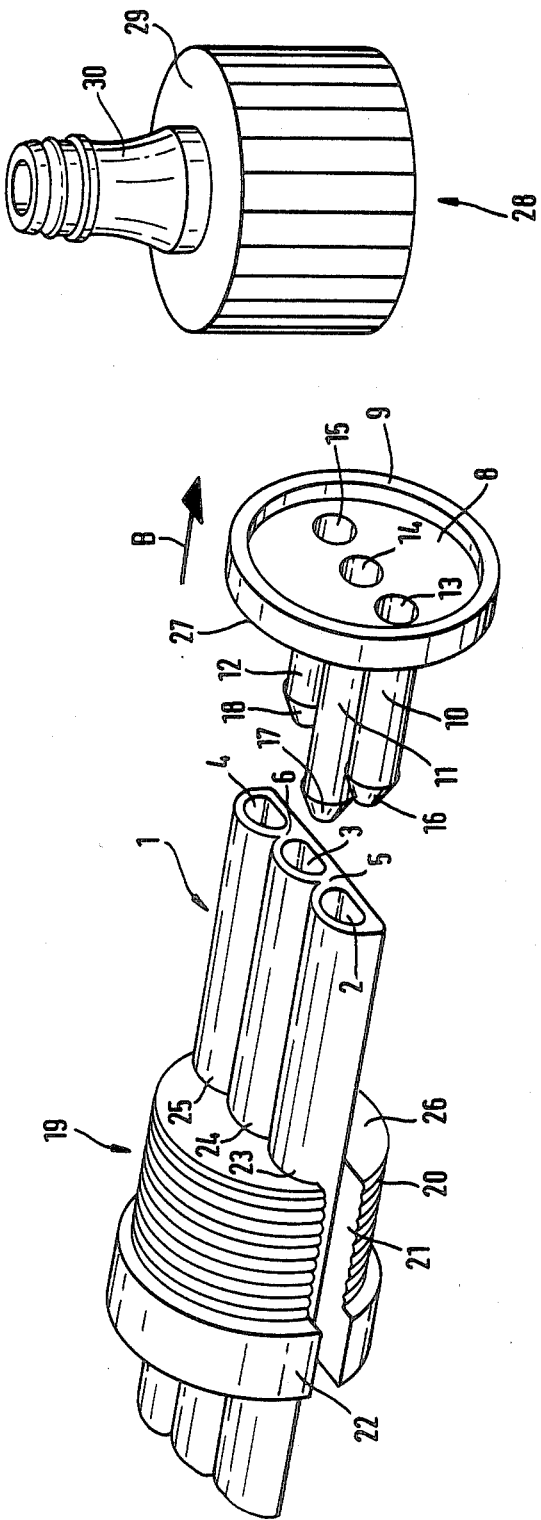

SPRAY HOSE ASSEMBLY

BACKGROUND OF THE INVENTION

For the purpose of providing a sprinkler or irrigation effect, spray hose assemblies have been developed which comprise a spray hose having a plurality of ducts therein, which extend in the longitudinal direction of the hose and which are separated from each other so as to carry separate flows of liquid therein. The hose further comprises a plurality of spary slots which are distributed over the length of the respective ducts and which communicate therewith and which are adapted to open under a pressure of liquid in the hose, whereby the liquid is discharged from the respective ducts in the hose, for example in the form of a spray or sprinkler configuration. In use, the hose is connected to a water pipe carrying, for example, water under pressure, or to a feed hose which also carries water under pressure. For that purpose, the spray hose is provided with suitable connecting fittings at the respective ends thereof.

Because the water which is introduced into the spray hose from the feed water hose or water pipe is distributed to the respective ducts, it is possible for the hose to provide for a relatively uniform distribution of pressure over the length of the spray hose, by virtue of the spray slots communicating with the individual ducts being disposed in different regions of the hose. That therefore contributes to providing a uniform sprinkler or irrigation effect and pattern.

The fact that the hose comprises a plurality of ducts, for example three thereof, which are arranged in side-by-side relationship, means that the spray hose is of a substantially flat configuration in cross-section, that is to say, the width of the hose as measured in the direction in which the ducts are disposed in juxtaposed relationship is substantially greater than the dimension of the hose in a direction perpendicular thereto. That in turn means that the fittings which are disposed at the ends of the spray hose must provide a transition from the flat configuration of the spray hose to the generally round cross-sectional configuration of the feed water hose or water pipe to which the spray hose is connected. For that purpose, it is possible to cut through the partitioning walls which define the respective ducts in the interior of the hose, in the end regions in which the respective fittings are to be fitted, so that a round internal sleeve member can thus be pushed into that region of the spray hose. That in turn causes that region of the spray hose to be enlarged into a generally cylindrical configuration around the sleeve fitted therein, thus providing the transition from the flat cross-sectional configuration of the spray hose to the round configuration required for connection thereof.

An external sleeve with an annular cylindrical portion and flattened portions which correspond to the transitional region between the flat cross-sectional shape and the round cross-sectional shape embraces the fixing region of the hose from the outside thereof. The hose is fixed between the internal and external sleeves, for example by the hose being pressed by means of special tools into position between the internal and external sleeves which comprise for example brass.

However, a disadvantage with that design is that the fitting cannot be readily fitted by a lay person but in practice can only be fitted in the works. That means inter alia that the user of the spray hose is unable to reduce the length thereof, although that is often desirable as spray hoses are often intended to be used in small areas with nooks and crannies, front gardens or the like.

SUMMARY OF THE INVENTION

An object of the present invention is to provide a spray hose assembly which substantially does not suffer from disadvantages of the previous hose arrangements.

Another object of the present invention is to provide a spray hose assembly with at least one fitting thereon, which assembly can be easily adjusted to a particular required length, even by an unskilled person.

Yet another object of the present invention is to provide a spray hose assembly which enjoys an enhanced degree of flexibility in regard to use thereof, by virtue of a simple and easily manipulatable construction.

In accordance with the principles of the present invention, those and other objects are achieved by a spray hose having a plurality of ducts therein and spray slots which are distributed over the length of and which are in communication with respective ones of the ducts, being adapted to open under an internal pressure in the respective ducts. Disposed at the ends of the hose are respective fittings, each such fitting comprising a plurality of push-in nipples with internal ducts therein, the number of said nipples corresponding to the number of ducts in said hose and the outside diameter of said nipples corresponding at least to the inside diameter of the ducts in the hose, whereby a respective nipple can be pushed into each duct. Each fitting further comprises a mouth plate which jointly mounts said nipples, said plate having a plurality of openings therethrough, each communicating with a respective said internal duct in said nipples, in conjunction with a clamping means for clamping the hose around the nipples.

It will be seen therefore that with this design configuration in accordance with the invention, there is no longer any need to cut through the partitioning walls between the ducts in the hose, in the end regions thereof, in order to insert the fittings, but instead the nipples are simply pushed into the respective ducts and held fast in position therein by the clamping means which acts on the hose from the outside thereof.

The nipples can be secured in a particularly secure fashion and in particular can provide a good liquid-tight connection to the respective ducts in the hose, if, in accordance with a preferred embodiment of the invention, each of the nipples are of different lengths, and the annular projections thereon are arranged at different locations on the respective nipples. In other words, the annular projections on the respective nipples are not all in alignment with each other in a direction which is transverse with respect to the direction of the ducts extending through the nipples. The mutually displaced or offset arrangement of the annular projections on the respective nipples, which is provided in that fashion, means that there is more space between the respective nipples for fitting the respective ducts of the hose over the nipples, and thus the annular projections do not interfere with each other to resist fitting of the hose on to the nipples.

A further preferred embodiment of the invention provides that the clamping means comprises a slotted or spslit ring having an external screwthread thereon. Extending through the ring are a plurality of recesses which in the position of use are adapted to bear against the region of the hose into which the push-in nipples are fitted. The number of said recesses corresponds to the number of ducts in the hose. The clamping means further comprises a screw sleeve having an internal screwthread, which can be screwed on to the external screwthread of the slotted ring. The screw sleeve is thus substantially in the form of a cap nut and further carries a hose connecting portion for connection to a hose, together with an annular shoulder which is adapted to bear against an axially projecting flange portion on the mouth plate of the fitting. Thus, when the screw sleeve is screwed on to the slotted ring, the annular shoulder of the screw sleeve presses against the flange portion of the mouth plate and urges it towards the hose, thereby securely engaging the nipples into the respective ducts in the hose.

The hose connecting portion is desirably in the form of a push-in or plug-in connection, thus permitting the fitting to be directly connected to conventional plastic water pipe connecting systems.

Further objects, features and advantages of the present invention will be apparent from the following description of a preferred embodiment thereof.

BRIEF DESCRIPTION OF THE DRAWINGS

FIG. 2 is an exploded view of the arrangement shown in FIG. 1.

DESCRIPTION OF THE PREFERRED EMBODIMENT

Figure 1:
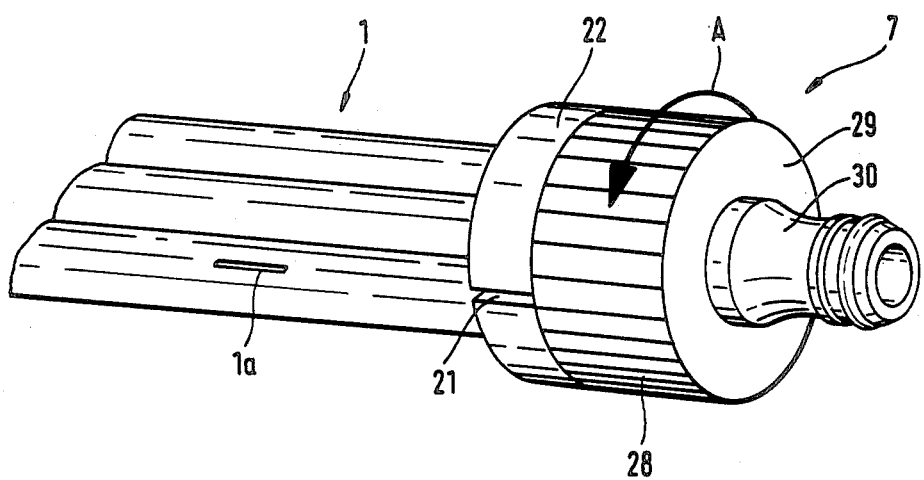
FIG. 1 is a diagrammatic perspective view of a spray hose with a fitting disposed at one end thereof, for push-in connection.

Referring now to the drawings, shown therein is a spray hose assembly comprising a spray hose which is generally indicated by reference numeral 1 and which has therein three ducts 2, 3 and 4 which are separated from each other by partitioning walls indicated at 5 and 6. The ducts 2, 3 and 4 thus carry mutually separate flows of liquid such as water therethrough. Each of the ducts 2, 3 and 4 has a plurality of spray slots, of which one is indicated at 1a in FIG. 1. The spray slots are distributed over the length of the respective ducts, in respective portions thereof, and are adapted to open under a pressure within the ducts, thereby to provide a sprinkler or irrigation effect from each of the ducts.

Disposed at the illustrated end of the spray hose 1 is a fitting which is generally identified in FIG. 1 by reference numeral 7. The fitting 7 comprises a carrier portion in the form of a mouth plate 8 which has an axially projecting, peripherally extending flange portion 9 thereon. Arranged on the side of the plate 8 which is opposite to the flange portion 9 are push-in nipples 10, 11 and 12 which are of different lengths, as can be best seen from FIG. 2, the spacing of the nipples 10, 11 and 12 and the outside diameter or transverse dimension thereof correspoonding at least to the spacing and inside diameter or transverse dimension of the ducts 2, 3 and 4. At their end portions which are remote from the plate 8, the nipples 10, 11 and 12 are of a conically convergent configuration, to facilitate insertion thereof into the respective ducts 2, 3 and 4. The nipples 10, 11 and 12 have internal ducts or passages extending therethrough, which communicate with openings 13, 14 and 15 which similarly extend through the plate 8.

Adjacent their free ends, the nipples 10, 11 and 12 are further provided with annularly projecting portions 16, 17 and 18. As can be seen from FIG. 2 and as referred to above, the nipples 10, 11 and 12 are of different lengths, and the projecting portions 16, 17 and 18 are provided at different locations thereon, so that the projecting portions are not in mutually aligned relationship transversely with respect to the lengthwise direction of the nipples.

In the condition of use of the assembly, the nipples 10, 11 and 12 are pushed into the respective ducts 2, 3 and 4 in such a way that the plate 8 then lies against or at least substantially close to the end face of the hose 1. The region of the hose which is fitted on to the nipples is then clamped from the outside by a clamping means. In the illustrated embodiment, the clamping means is in the form of a slotted or split ring 19 having an external screwthread 20 which is of a slightly convergent configuration towards the free end, that is to say, towards the right in FIG. 2. Reference numeral 21 denotes a slot in the ring 19, to permit the ring 19 to be compressed by reducing the width of the slot 21, in a manner to be described hereinafter, in order thereby to apply a clamping force to the hose 1. Reference numeral 22 in FIG. 2 denotes a flange portion of the clamping means.

The ring 19 is further provided in its interior with a plurality of recesses as indicated at 23, 24 and 25. The number of such recesses corresponds to the number of ducts 2, 3, 4 and the configuration thereof matches the external configuration of the side of the hose 1 which is upward in FIG. 2, as can be clearly seen therefrom. The side of the slot 21 which is opposite to the recesses 23, 24 and 25 does not have any corresponding recesses, in the illustrated embodiment, as the spray hose shown in the drawings is at least substantially flat at its underside, as can be seen from the cross-section at the end face thereof in FIG. 2.

In the condition of use of the assembly, the slotted ring 21 is arranged in such a way that it embraces that part of the hose 1 into which the nipples 10, 11 and 12 are inserted. Preferably the arrangement is such that the ends face 26 of the ring 19 comes to bear against the face indicated at 27 of the plate 8.

A screw sleeve or ring 28 is then screwed on to the external screwthread 20 of the ring 19. For that purpose, the screw sleeve 28 has an internal screwthread which is not shown in the drawings but which corresponds to the external screwthread 20 on the ring 19. The sleeve 28 which is thus in the form of a cap nut further has an annular shoulder 29 whose inside surface comes to bear against the axially projecting flange portion 9 on the plate 8, when the sleeve 28 is screwed on to the ring 19. A suitable seal may be disposed if required or advantageous, between the inside surface of the annular shoulder 29 and the flange portion 9.

The screw sleeve 28 further carries a hose connecting portion 30 which is shown in the form of a push-in connecting portion.

The fitting illustrated permits a rapid connection to known plastic coupling systems.

The fitting 7 can be easily fitted and removed even by a lay person, without the use of special tools. In order, for example, to reduce the length of the spray hose 1, the screw sleeve 28 is unscrewed by turning it in the direction indicated by the arrow A in FIG. 1. The slotted ring 19 is then pushed back into the position shown in FIG. 2, and the nipples 10 through 12 are then drawn out of the ducts 2, 3 and 4 in the hose 1, for example by pulling on the plate 8, in the direction indicated by the arrow B in FIG. 2. The hose 1 can then be cut to the desired length, and the arrangement can then be reassembled by operating in the reverse sequence to that set forth above.

It will be appreciated that the above-described embodiment has been set forth purely by way of example of the principles of the present invention and that accordingly various modifications and alterations may be made therein without thereby departing from the spirit and scope of the invention.

I claim:

1. A fitting adapted to be removably mounted on the substantially-parallel marginal end portions of at least two flexible hoses arranged to have substantially coterminus end faces, comprising:

a plate member having at least two openings therethrough and having at least two substantially-parallel elongated nipples mounted thereon, each nipple having one marginal end portion secured to said plate member about a respective one of said openings and having a distal end portion adapted to be slidably inserted into a respective one of said hose marginal end portions, said nipples being of different lengths so that said distal end portions are longitudinally staggered with respect to one another; and clamping means operatively arranged to compress said hose marginal end portions into sealed clamping engagement with said nipples.

2. A fitting as set forth in claim 1 wherein each of said nipples has a projection extending outwardly from said distal end portion.

3. A fitting as set forth in claim 2 wherein each of said projections are longitudinally staggered with respect to one another.

4. A fitting as set forth in claim 1 wherein said hoses have a common web.

5. A fitting as set forth in claim 1 wherein said clamping means includes:

a slotted ring adapted to be mounted on said hoses so as to surround the lengths of said nipples, said ring having an internal surface shaped to complement the exterior shapes of said hoses and having an exterior screwthread; and a cap member having a surface engaged to abut said plate member and having an internal screwthread adapted to mate with said external screwthread;

whereby, when said cap member is rotated so as to tighten such mating screwthread connection, said hose marginal end portions will be compressively clamped between said nipples and said slotted ring.

6. A fitting as set forth in claim 5 wherein said screwthreads are slightly conical to provide such clamping action when tightened.

7. A fitting adapted to be removably mounted on the substantially-parallel marginal end portions of at least two flexible hoses arranged to have substantially coterminus end faces, comprising:

a plate member having at least two openings therethrough and having at least two substantially-parallel elongated nipples mounted thereon, each nipple having one marginal end portion secured to said plate member about a respective one of said openings and having a distal end portion adapted to be slightly inserted into a respective one of said hoses, each nipple having an outwardly-extending projection, said projections being longitudinally staggered with respect to one another; and clamping means operatively arranged to compress the marginal end portions of said hoses into sealed clamping engagement with said nipples.

* * * * *